Patented Oct. 24, 1933

1,932,130

UNITED STATES PATENT OFFICE 1,932,130

MANUFACTURE OF PHOSPHORIC ACID COMPOUNDS OF MENTHOLS

John William Blagden and Walter Edward Huggett, Ilford, England, assignors of one-third to Howards & Sons, Limited, Ilford, England, a British company No Drawing. Application February 24, 1932, Serial No. 594,960, and in Great Britain March 17, 1931

17 Claims. (Cl. 260—153)

By this invention, new products having useful properties are made by the action of ortho-phosphoric acid on a menthol. The process may consist merely in mixing the menthol and phosphoric acid or an aqueous solution of phosphoric acid (which latter should preferably be of fairly high concentration), preferably in the proportion of about three molecular proportions of the menthol to one molecular proportion of phosphoric acid, at ordinary temperature and in presence or absence of an organic solvent which is indifferent to phosphoric acid, such as a liquid hydrocarbon. When the phosphoric acid and menthol are mixed in absence of a solvent, it is preferable that the menthol be in liquid or molten condition. When there is used a phosphoric acid containing water, it is advantageous to remove the water from the reaction mixture as far as possible; for this purpose, the reaction may be conducted in presence of an organic solvent which when distilled will carry away the water, or in presence of an organic solvent which is not miscible with water and from which it can be separated by decantation.

The invention may be applied to optically inactive menthol, to its stereoisomers, such as inactive isomenthol and neomenthol, and to the various optically active forms of these substances, as well as to mixtures of menthols such as the crude or partially purified synthetic menthols obtainable, for example, by reduction or hydrogenation of thymol, menthone, piperitone or the like, or by isomerization of the reduction or hydrogenation products, for example by the process described in British Specification No. 213,991 or No. 238,314. All these menthols and isomers are to be understood as comprised by the term "a menthol" as used herein.

The compounds obtained in accordance with the invention are in general white crystalline bodies having well defined melting points. They are slowly decomposed by water at ordinary temperature, yielding the menthol and free phosphoric acid and are more rapidly decomposed by hot water or by caustic alkali solutions. They may also be decomposed into their constituents by heating. If the compound be heated under reduced pressure, the menthol may distil, the phosphoric acid being left as residue; in the case of the compound prepared from neomenthol, the neomenthol slowly evaporates under reduced pressure even at ordinary temperature.

The properties and results of analysis of the new compounds indicate that they are addition compounds of the menthol and ortho-phosphoric acid.

The following examples illustrate the invention, the parts being by weight:—

1. 100 parts of racemic menthol are dissolved in 100 parts of petroleum ether and the solution is mixed at ordinary temperature with about 20–25 parts of ortho-phosphoric acid of specific gravity 1.75. The new product separates in the form of crystals, which may be purified by various means, such as by recrystallization from petroleum ether. The reaction may also be conducted without a solvent.

2. 100 parts of racemic methol are dissolved in 65 parts of petroleum ether and 24 parts of ortho-phosphoric acid of 90 per cent. strength (specific gravity 1.75) are added. The whole is boiled for a short time, the petroleum ether which distils carrying with it a small quantity of water, from which it is separated and returned to the distillation vessel. The quantity of water thus eliminated corresponds with that initially present in the phosphoric acid. The liquid in the distillation vessel, now completely homogeneous, is cooled, whereupon crylstals commence to separate. When crytallization is complete, the crystals are separated by filtration, 110 parts of crystals being obtained which, when recrystallized from 130 parts of petroleum ether yield 100 parts of crystals having a melting point of 74° C.

Analysis indicates that the product, which is optically inactive, is an addition compound containing one molecule of phosphoric acid for each three molecules of menthol.

3. 100 parts of natural lævo-menthol (melting point 43° C.) are dissolved in 65 parts of petroleum ether and 24 parts of ortho-phosphoric acid of specific gravity 1.75 are added. The further procedure is as described in Example 2. 100 parts of crystals are obtained which, when recrystallized from 195 parts of petroleum ether, yield 61 parts of crystals of melting point 71° C. The product is lævo-rotary and is soluble in the usual organic solvents. It contains three molecules of lævo-menthol for each molecule of phosphoric acid.

4. 100 parts of racemic neomenthol of melting point 53° C. are heated to 60° C., and there are added to the melt 21 parts of ortho-phosphoric acid of 100 per cent. strength, the whole being well stirred. The mass at once commences to crystallize and finally sets to a solid mass, which, when cold, is subdivided and recrystallized from 190 parts of benzene. There are obtained 85 parts of a compound of melting point 86° C.

5. 100 parts of racemic isomenthol of melting point 49° C. are melted and mixed, whilst stirring, with 24.5 parts of ortho-phosphoric acid of specific gravity 1.75. There are then added 325 parts of petroleum ether and the whole is allowed to stand for several hours at ordinary temperature until clear. The clear petroleum ether solution is then separated by decantation from a small quantity of water and acid which has separated, and the petroleum ether is removed by heating, finally with the aid of a reduced pressure. There remains a gummy oil which solidifies after some time to a product which melts at 42° C. and is very soluble in the usual solvents.

Having thus fully described the nature of the said invention and the best means we know of carrying the same into practical effect, we claim:—

1. A manufacture of phosphoric acid compounds of menthol by causing a menthol to react with ortho-phosphoric acid.

2. A manufacture of phosphoric acid compounds of menthol which comprises causing to react together about three molecular proportions of a menthol and one molecular proportion of ortho-phosphoric acid.

3. A manufacture of phosphoric acid compounds of menthol by causing a menthol to react with ortho-phosphoric acid in presence of an organic solvent indifferent to phosphoric acid and separating the product from the solvent.

4. A manufacture of phosphoric acid compounds of menthol which comprises causing about three molecular proportions of a menthol to react with one molecular proportion of ortho-phosphoric acid in presence of an organic solvent indifferent to phosphoric acid and separating the product from the solvent.

5. A manufacture of phosphoric acid compounds of menthol by causing a menthol to react with ortho-phosphoric acid in presence of a liquid hydrocarbon and separating the product from the solvent.

6. A manufacture of phosphoric acid compounds of menthol which comprises causing about three molecular proportions of a menthol to react with one molecular proportion of ortho-phosphoric acid in presence of a liquid hydrocarbon and separating the product from the solvent.

7. A manufacture of phosphoric acid compounds of menthol by causing to react together a menthol in the liquid state and ortho-phosphoric acid.

8. A manufacture of phosphoric acid compounds of menthol by causing to react together about three molecular proportions of a menthol in the liquid state and one molecular proportion of ortho-phosphoric acid.

9. A manufacture of phosphoric acid compounds of menthol which comprises causing to react together a menthol and aqueous ortho-phosphoric acid and substantially removing the water from the reaction mixture.

10. A manufacture of phosphoric acid compounds of menthol which comprises causing to react together a menthol and aqueous phosphoric acid in presence of an organic solvent indifferent to phosphoric acid, substantially removing the water from the reaction mixture by distillation and isolating the product.

11. A manufacture of phosphoric acid compounds of menthol which comprises causing a menthol to react with ortho-phosphoric acid in presence of petroleum ether, allowing the whole to stand and separating the crystals which have formed.

12. A manufacture of phosphoric acid compounds of menthol which comprises causing about three molecular proportions of a menthol to react with one molecular proportion of ortho-phosphoric acid in presence of petroleum ether, and removing the petroleum ether by distillation.

13. Addition compounds of menthols and ortho-phosphoric acid decomposable by heating into a menthol and ortho-phosphoric acid.

14. Addition compounds of menthols and ortho-phosphoric acid containing three molecules of a menthol for each molecule of ortho-phosphoric acid and decomposable by heating into a menthol and ortho-phosphoric acid.

15. The crystalline addition compound of racemic menthol and ortho-phosphoric acid containing three molecules of racemic menthol for each molecule of ortho-phosphoric acid and having a melting point of about 74° C.

16. The crystalline addition compound of isomenthol and ortho-phosphoric acid having a melting point of about 42° C.

17. The crystalline addition compound of neomenthol and ortho-phosphoric acid having a melting point of about 86° C.

JOHN WILLIAM BLAGDEN.
WALTER EDWARD HUGGETT.